United States Patent [19]

Bergman et al.

[11] 3,873,860

[45] Mar. 25, 1975

[54] MHD POWER GENERATION

[75] Inventors: Perry D. Bergman, Pittsburgh; Daniel Bienstock, Bruceton, both of Pa.

[73] Assignee: The United States of America as represented by the Secretary of the Interior, Washington, D.C.

[22] Filed: Nov. 21, 1973

[21] Appl. No.: 417,832

[52] U.S. Cl. ................................................. 310/11
[51] Int. Cl. ............................................. H02n 4/02
[58] Field of Search .......................... 310/11; 60/264

[56] References Cited
UNITED STATES PATENTS

| | | |
|---|---|---|
| 3,176,166 | 3/1965 | Gunther et al ...................... 310/11 |
| 3,214,616 | 10/1965 | Way et al ........................... 310/11 |
| 3,247,405 | 4/1966 | Rosner ............................... 310/11 |
| 3,439,195 | 4/1969 | Rummel .............................. 310/11 |
| 3,531,665 | 9/1970 | Rosa ................................... 310/11 |

FOREIGN PATENTS OR APPLICATIONS 970,143  9/1964  United Kingdom.................. 310/11

*Primary Examiner*—Donovan F. Duggan
*Attorney, Agent, or Firm*—William S. Brown; Gersten Sadowsky

[57] ABSTRACT

Mixed potassium-cesium seeding of a high temperature combustion gas is employed in production of electricity by means of an open-cycle MHD generator.

2 Claims, No Drawings

MHD POWER GENERATION

MHD (magnetohydrodynamic) power generation is conventionally based on the ionization of a seeding compound at elevated temperatures to supply electrons to a hot combustion gas. This seeding compound must be a relatively inexpensive material, as well as a good provider of electrons. Potassium salts have generally been preferred as seeding compounds, because of their low ionization potential and their relative abundance in nature. Cesium salts can donate electrons more readily than potassium salts, but raw material costs five time that of potassium are incurred to achieve the same level of electrical output from a MHD duct.

Potassium salts are particularly advantageous as seeding compounds in coal-burning open-cycle MHD processes, since the seed itself removes essentially all of the sulfur contained in a typical U.S. coal. This results in an effluent that is substantially free of $SO_2$, thus eliminating, or greatly reducing, air pollution.

Cesium compounds, usually pollucite ore, have also been used for seeding combustion gases in MHD processes, and a cesium-seeded combustion plasma exhibits a greater electrical conductivity than does a potassium-seeded plasma seeded with an equal number of atmos. This is, of course, advantageous from the standpoint of efficiency of the MHD cycle in the production of electricity.

However, the use of pure cesium, or cesium compounds, as seeding material has several serious disadvantages: the high price of cesium-containing pollucite ore, limited availability of the ore, and the fact that cesium is much less economical than potassium for removal of sulfur oxides.

It has now been found that the above problems may be largely overcome by the use of a mixed potassium-cesium seed in which the potassium comprises about 75 to 95 atomic percent of the total potassium-cesium content of the seed. Use of this $K-C_s$ seed results in high MHD plasma conductivities, low-cost sulfur removal and reasonable seed makeup costs, as well as potential conservation of existing cesium reserves. In addition, it has been found that substantial reductions in overall cost of open-cycle MHD power production may be achieved with the mixed seeding, provided seed recovery efficiency is about 98 percent or better, i.e., less than about 2 percent of the seed is lost.

MHD power generation processes, in which the mixed $K-C_s$ seed of the invention may be employed, conventionally comprise (1) burning a fuel in preheated, compressed, sometimes oxygen-enriched, air to produce a gaseous product having a temperature of about 4,000° to 5,500°F, (2) seeding of the combustion gas with a compound of a readily ionized element to increase the conductivity of the gas, (3) passing the seeded gas through a nozzle to provide a gas velocity of about 200 to 1,800 m/sec, (4) passing the hot gas at high velocity through an MHD duct provided with a suitable magnetic field and electrodes for collecting current generated by passage of the conducting gas through the magnetic field, (5) decelerating the gas leaving the MHD channel by means of a diffuser, so as to convert gas kinetic energy to pressure energy, (6) passing the hot waste gas through boiler or heat exchanger means to recover up to about 90 percent of the thermal energy from the gas, (7) separation and recovery of seed, and elimination of sulfur dioxide and nitrogen oxides from the waste gas, and recycle of the regenerated seed to the combustion stage of the process. The overall power generation process will also usually include a bottoming cycle, generally a steam boiler, for utilization of the heat recovered from the waste gas to produce additional electricity.

Fuels for the MHD process conventionally consist of natural gas, kerosene, fuel oil, coal or char. Coal is a favored fuel because of its relative abundance in nature and because under similar conditions of combustion a coal or char combustion plasma has a higher electrical conductivity than those obtained from other fuels. The mixed $K-C_s$ seeding of the invention is particularly effective where the fuel is coal since, as discussed above, $SO_2$ is largely removed with the seed when the latter is recovered from the waste gas. When coal is employed as fuel, it is usually used in pulverized form, at a feed rate of about 0.5 to 500 tons per hour.

Various gasification-combustion techniques such as conventional combustion, cyclone gasification, suspension gasification and fluid bed gasification may be used. A two-stage combustion process is generally preferred, particularly for reduction of nitrogen oxide content of the waste gases. The combustion process should be capable of providing a product gas having a temperature of about 4,000° to 5,500°F at a pressure of about 2 to 20 atm. Preheated and compressed air, which may be oxygen-enriched, is generally used to effect combustion of coal or char. Suitable temperatures and pressures of the preheated air are 1,500° to 3,000°F and 2 to 20 atm.

Seeding may be accomplished by addition of the seeding material to the combustion gas prior to leaving the combustion zone. Generally, the seed compounds are added as an aqueous solution of a concentration of about 0.5 to 2 g seed per cc water. Introduction into the combustion gas may be by procedures such as pumping the solution into the burner combustion zone. Suitable concentrations of seed in the combustion gas may range from about 0.25 to 1.25 mole percent of potassium and about 0.08 to 0.40 mole percent of cesium. However, optimum amounts may vary considerably depending on the power output of the MHD generator, the fuel employed, the amount of air used, particular seed compounds employed, and specific types of treatment of the waste gases, and are best determined empirically.

Where solid fuel is employed, e.g. coal or char, seeding may be accomplished by addition of the seeding compounds, in essentially dry form, directly to the fuel prior to, or simultaneously with, the feeding of the fuel to the combustion zone. Generally, amounts of seed may range from about 1.0 to 5.0 gram moles of potassium and 0.3 to 1.5 gram moles of cesium per kilogram of fuel. The seed conventionally consists of oxides, sulfates or carbonates of a readily ionizable element such as potassium or cesium. Minerals or ores, such as pollucite, may also be suitable.

The feed material of the invention consists of a mixture of potassium and cesium compounds in which the potassium comprises about 75 to 95 atomic percent, preferably about 85 atomic percent, of the total alkali metal (potassium-cesium) content of the seed. The required amounts of potassium and cesium, respectively, may be supplied by admixture of any of the above-discussed types of compounds, the essential requirement of the invention being the relative total amounts of potassium and cesium in the seed. A particularly preferred seed composition comprises about 78 percent by weight of potassium sulfate and about 22 percent by weight of cesium oxide, the latter being in the form of pollucite ore. Addition of the seeding material of the invention to the combustion gas is accomplished by means of conventional procedures, as discussed above.

The hot seeded combustion are expanded, in conventional manner, through a nozzle to provide a gas velocity of about 200 to 1,800 m/sec, and the ionized gases then flow through an MHD duct where a d.c. current is generated by the conducting gas passing through the magnetic field associated with the duct. Again, these procedures and structures are conventional and optimum parameters such as dimensions of the duct, strength of the magnetic field, structural materials, types of electrodes, etc. may vary widely depending on the abovediscussed variables. However, in general a duct length of about 4 to 40 meters and a magnetic field strength of about 2 to 8 teslas may be employed.

The gases are then passed through a diffuser where the gas velocity is diminished to a few m/sec and the pressure is raised to about 1.1 to 1.3 atm for the purpose of converting the flow energy of the gas to pressure energy.

Treatment of the waste gases exiting from the MHD duct and diffuser is also conventional and includes recovery and recycle of the seed, with accompanying removal of sulfur dioxide. Seed recovery is generally by means of wet recovery processes such as water scrubbing, or by means of electrostatic precipitation and gas filtration, or a combination of the three. For overall reduction in the cost of power generation by the process of the invention, seed recovery efficiency should be at least 98 percent, with a recovery of 99 percent or better being preferred. Such efficiencies are readily achieved by conventional wet processing and electrostatic precipitation procedures.

As discussed above, substantially all of the $SO_2$ is removed from the waste gas with the seed. Separation and recovery of the $SO_2$ is by conventional means such as leaching, vacuum crystallization, reaction with a reducing gas and scrubbing out $H_2S$ with a hot solution, followed by the Claus process for the production of elemental sulfur.

The waste gases generally also contain oxides of nitrogen. These may also be removed by conventional means such as two-stage combustion, which reduces NOx emissions below Federal Standards.

We claim:

1. In a method for producing electrical energy by passing a seeded high temperature gaseous combustion product, obtained by combustion of coal, at high velocity through a MHD duct, the improvement comprising employing as seeding material a mixture of potassium and cesium compounds in which the potassium comprises about 75 to 95 atomic percent of the total potassium-cesium content of the seed.

2. The method of claim 1 in which the seeding material consists of about 78 percent by weight of potassium sulfate and about 22 percent by weight of cesium oxide.

* * * * *